H. ENARD.
VARIABLE SPEED POWER TRANSMITTING MECHANISM.
APPLICATION FILED JUNE 10, 1920.
1,380,868. Patented June 7, 1921.
4 SHEETS—SHEET 1.
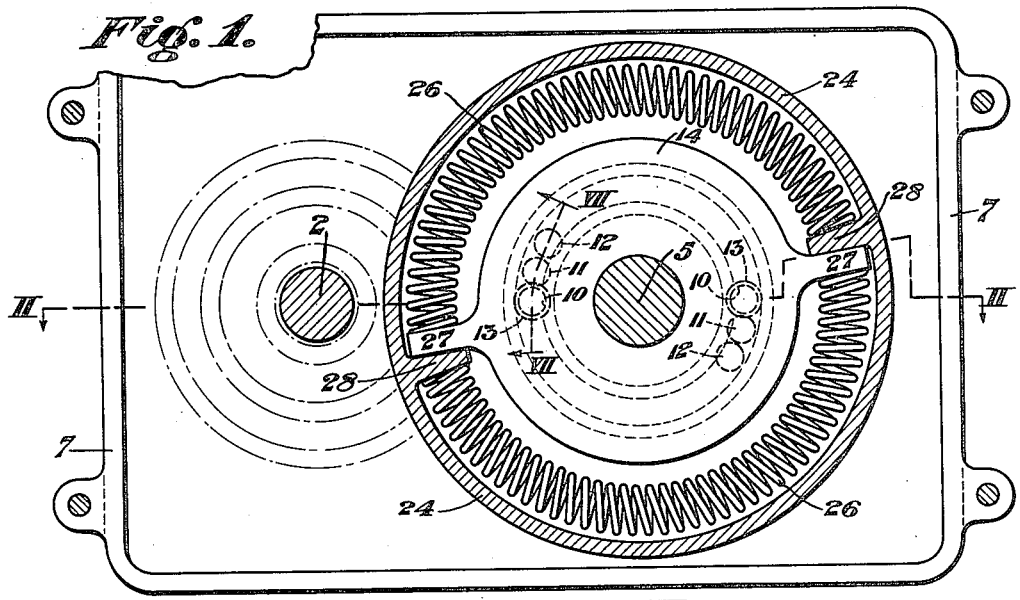
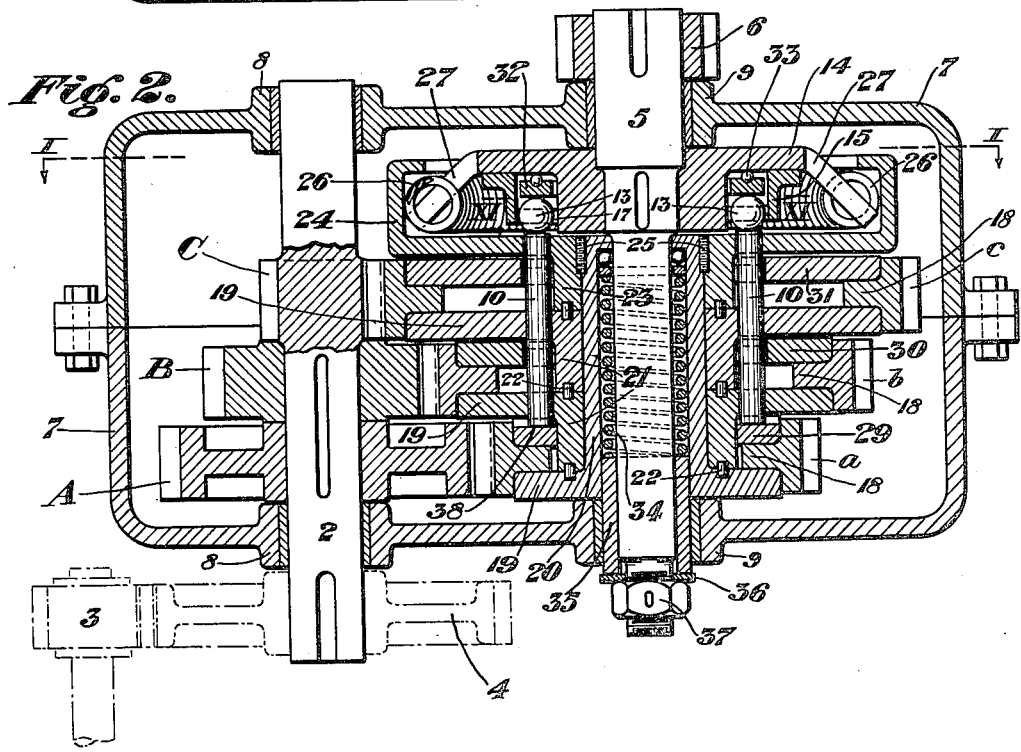

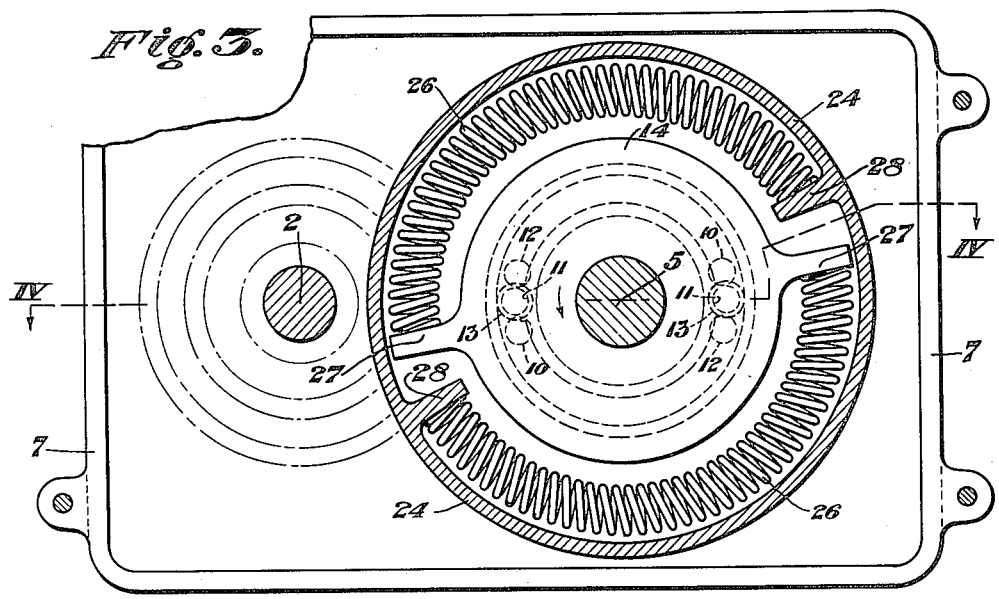
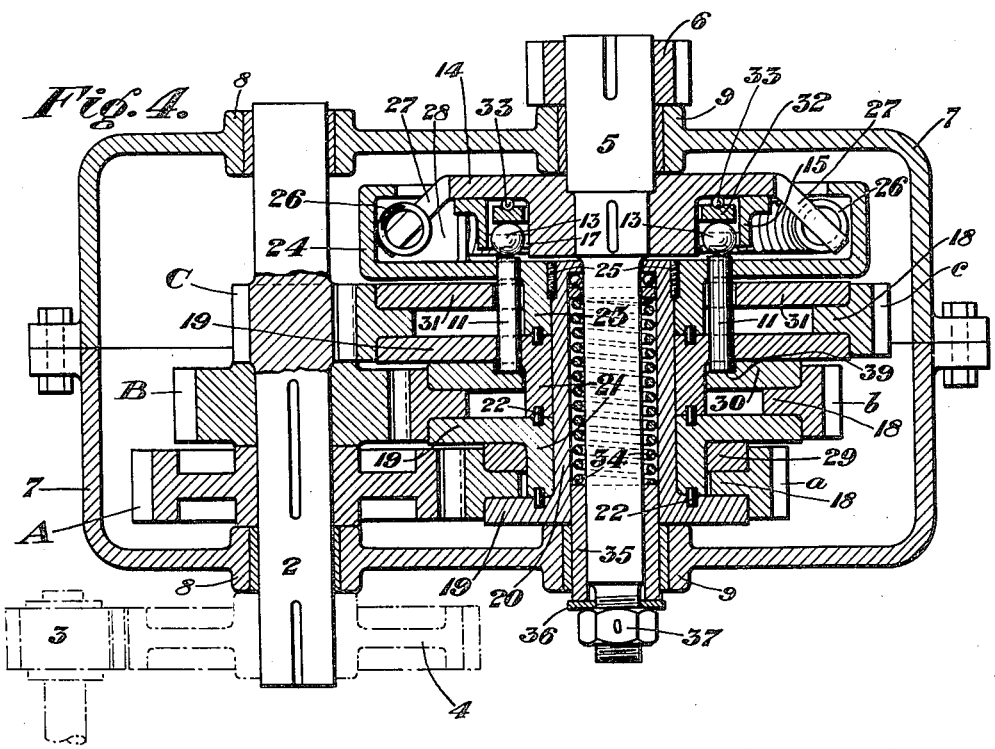

H. ENARD.
VARIABLE SPEED POWER TRANSMITTING MECHANISM.
APPLICATION FILED JUNE 10, 1920.
1,380,868.
Patented June 7, 1921.
4 SHEETS—SHEET 3.
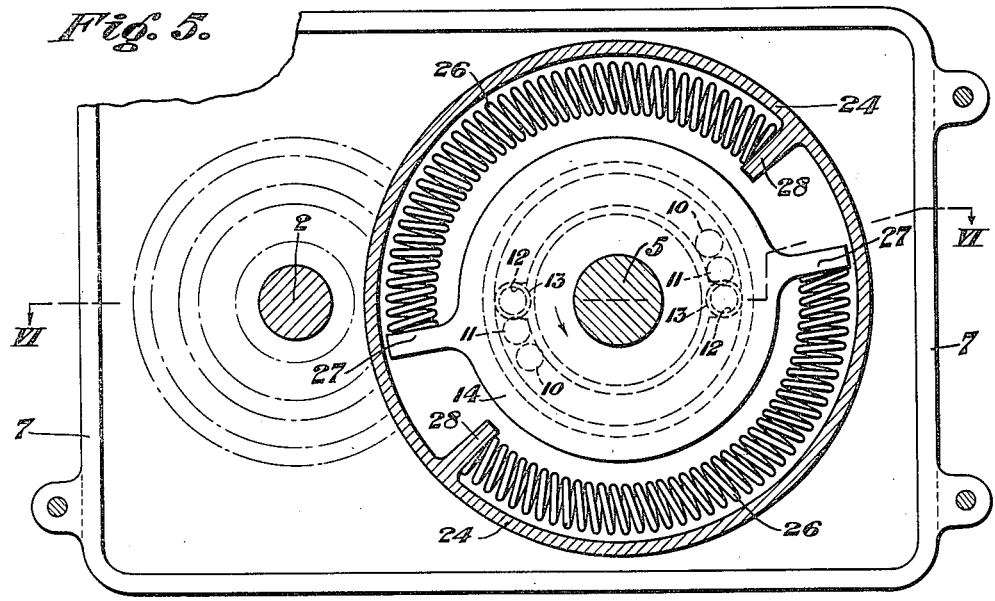
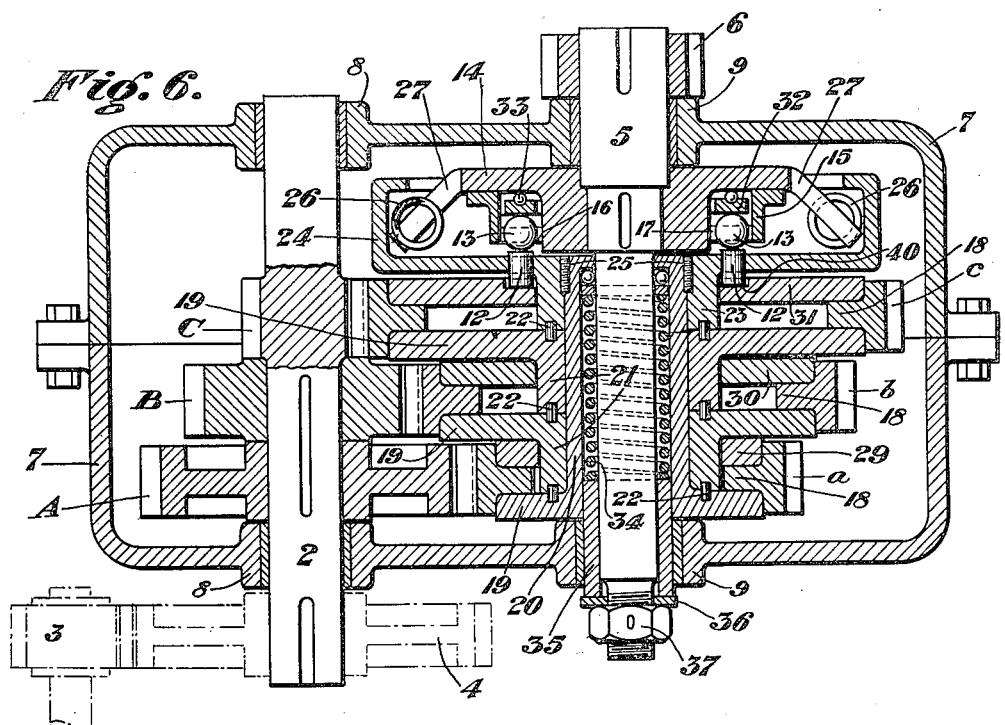

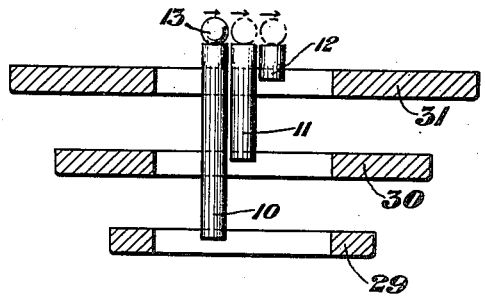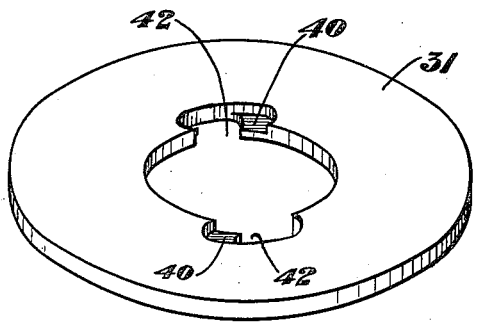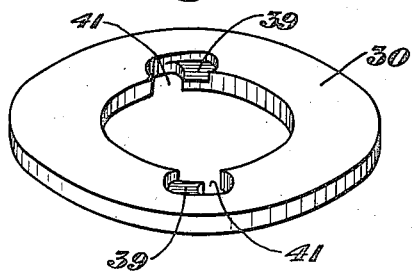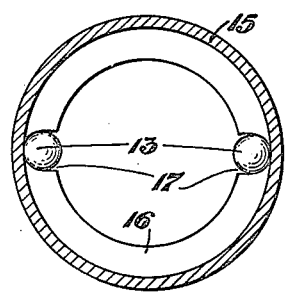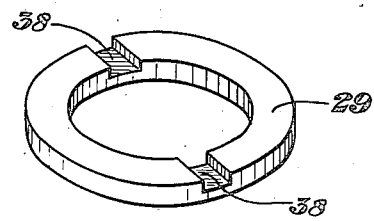

UNITED STATES PATENT OFFICE.

HANS ENARD, OF PITTSBURGH, PENNSYLVANIA, ASSIGNOR OF ONE-HALF TO WILLIAM J. HEYL, OF PITTSBURGH, PENNSYLVANIA.

VARIABLE-SPEED POWER-TRANSMITTING MECHANISM.

1,380,868.   Specification of Letters Patent.   Patented June 7, 1921.

Application filed June 10, 1920. Serial No. 387,867.

*To all whom it may concern:*

Be it known that I, HANS ENARD, a citizen of Germany, residing at Pittsburgh, in the county of Allegheny and State of Pennsylvania, have invented certain new and useful Improvements in Variable-Speed Power-Transmitting Mechanism, of which the following is a specification.

My invention refers to improvements in variable speed power transmitting mechanism. It has for its object to provide means for varying the speed of the load transmitted to its actuating gearing from a constant power, through intervening transmitting gearing capable of being shifted into clutch engagement by mechanism subject to variations in the load.

Generally stated, the invention utilizes a shaft geared to a prime mover, of constant torque, provided with a plurality of driving gears of varying pitch diameter, a corresponding plurality of driven gears of proportioned varying pitch diameter, a driven shaft geared with the load, a spanner secured to the driven shaft and in elastic compensating connection by interposed springs with a master or controlling wheel which is provided with a series of individual locking or clutching devices for each of the driven wheels, subject to individual actuation by the spanner in its several load-controlled positions so as to automatically bring into and out of gear connection with the driven shaft the proper pair of intermeshing gears, driving and driven, for the load encountered at any particular time, with the speed and power proportioned thereto.

The invention further accomplishes the automatic return of the mechanism to normal position upon release of the load for accelerated motion of the load shaft when running idle, or under light loads, and in either direction, so as to speed up the mechanism to accomplish its desired functions with a minimum loss of time.

Referring to the drawings, which show one preferred embodiment of the invention, Figure 1 is a sectional plan view of the mechanism, on the line I—I of Fig. 2;

Fig. 2 is a vertical sectional view on the line II—II of Fig. 1, showing the mechanism in normal position for operation under no load or light load conditions;

Fig. 3 is a sectional view similar to Fig. 1, showing the position of the clutch actuating spanner and master wheel in their relative advanced positions under medium loads;

Fig. 4 is a vertical sectional view on the line IV—IV of Fig. 3, showing the same relative positions of the clutch actuating mechanism;

Fig. 5 is a sectional view similar to Figs. 1 and 3, showing the position of the clutch actuating spanner and master wheel in their relative advanced positions under maximum loads;

Fig. 6 is a vertical sectional view on the line VI—VI of Fig. 5, showing the same relative positions of the clutch actuating mechanism;

Fig. 7 is a partial detail vertical sectional view of the pins and rings of the clutch mechanism detached in their normal operative position, indicated by the transverse annular line VII—VII of Fig. 1;

Figs. 8, 9 and 10 are perspective detail views of the several pin pressed gripping rings of the driven gears;

Fig. 11 is a cross sectional detail view on the line XI—XI of Fig. 2, showing the ball-engaging ring of the driven shaft spanner.

Referring to the drawings, 2 is the driving shaft actuated from any suitable prime mover, as an electric motor, either directly or through gearing 3, 4, indicated in dotted lines, Fig. 2. Driven shaft 5, which is adapted to be put into variable operative connection with shaft 2 by the mechanism of the invention, is provided with a power transmitting gear 6 or pulley or other equivalent element, suitably keyed or otherwise secured, as shown. Said shafts and the associated mechanism are preferably mounted within a suitable casing 7 having journal bearings 8, 9, for the shafts, and adapted to be incorporated with or mounted upon any utilizing apparatus, as a crane, motor driven vehicle, or the like.

Driving shaft 2 is provided with a plurality of driving gears A, B, C, either keyed to or integral with the shaft, and of varying pitch diameters, as shown, whereby to transmit to their several intermeshing companion gears *a*, *b*, *c*, variable speeds and resultant variable power, depending on which particular pair of gears, *i. e.*, A, *a;* B, *b;* or C, *c;* is coupled together.

The coupling or clutching mechanism is designed to connect one pair of gears at a time only to transmit the desired driving speed and power to shaft 5, leaving the other pairs to run idle, by means of the several pairs of oppositely located clutch pins 10, 11, 12, which are depressed successively by the action of a rolling ball 13 in its rotative movement, as controlled by the load retarded action of a spanner 14, which is keyed to driven shaft 5. Said spanner is provided with a fixedly connected ring 15 having an inwardly extending annular flange 16 cut out at opposite sides, as at 17, for embracing engagement with the middle portion of balls 13. Each driven wheel *a*, *b*, *c*, is hollow, in ring form, and has a middle transverse inwardly extending annular web 18 which is embraced on one side by the flange 19 of a series of hubs 20 and 21, 21, respectively, all of which are fixedly connected by any suitable means, as dowel pins 22, so as to connect the several flanges 19 as a constant or unitary set.

The several flanges 19 are similarly connected with the hub 23 of spring holding master wheel 24, which is also keyed to the other end of hub 20 by key 25, whereby all of the flanges, hubs, and the spring wheel are joined as a unitary structure. It will thus be seen that the master wheel will revolve with all of the flanges 19 including the particular active driven wheel *a*, *b*, or *c* which is coupled with its driving wheel A, B or C. Also, that the several wheels *a*, *b*, *c*, are "floating" gears; *i. e.*, are inoperative except as to the particular gear which is in clutch engagement with the master wheel, the remaining wheels being free to revolve idly with their particular driving wheels A, B or C.

Driven shaft 5 and its fixedly connected spanner wheel 14 being rotatably independent of the master wheel, may have an independent rotative movement dependent on the retarding effect of the variable load transmitted through pinion 6. I therefore provide compensating springs 26 between the terminals 27 of spanner 14 and lugs or abutments 28 of the master wheel 24, whereby to vary the resistance between the spanner and the master wheel, in proportion to the load.

The effect of this provision is that as the load increases beyond normal, its retarding effect will cause the spanner to lag or recede within the spring holding case of master wheel 24, compressing the springs 26 as in Figs. 3 and 5, with a corresponding receding movement of balls 13 from engagement with pin 10 to pin 11, or with the maximum load, to pin 12, as indicated in Fig. 7. Each wheel *a*, *b*, and *c* is provided with a floating ring 29, 30 or 31, respectively laid on the other side of middle wheel web 18 and adapted to be gripped against such web to bind it between the floating ring and the opposite flange 19 when the particular pin 10, 11 or 12 is thrust inwardly by the ball 13.

The spanner 14 is preferably in shouldered engagement with shaft 5 and is provided with a pressure ring 32 bearing on balls 13 at one side and having a row of roller bearing balls 33 between its inner side and the raceway of the spanner, insuring smooth action with a minimum of friction.

Within the innermost hub 20 is a spiral spring 34 bearing by its inner end, or by a terminal ring, against the shouldered end of a receiving socket of hub 20, and by its outer end against a sleeve or bushing 35 in bearing 9. The end of shaft 5 is provided with a washer 36 and nut 37 whereby sufficient tension is provided to insure constant active pressure through the spanner and its ring 32 against the pin-pressing balls 13.

Each pin 10, 11 and 12 is of proper length to engage its particular ring 29, 30 and 31 respectively, and each ring is preferably provided with suitable receiving and retaining sockets or shouldered depressions 38, 39 and 40 respectively, as shown, to effect continuous connection with the respective pins. Inasmuch as pin 10 must extend through rings 31 and 30 to reach ring 29 and pin 11 must extend through ring 31 to reach ring 30, rings 31 and 30 are provided with clearance openings 41 and 42 respectively, for such purpose.

By this arrangement, the several pins 10, 11, 12 are arranged side by side with their opposite ends in the annular path of balls 13, so that one pin will be immediately engaged and depressed when the adjacent pin is released.

By this construction and arrangement but one of the several wheels *a*, *b*, *c*, can be coupled with the driven shaft 5 at a time, the remaining wheels rotating idly as driven by the inactive ones of wheels A, B, C. For instance, when the mechanism is operating under a light load at high speed in its normal position, Figs. 1 and 2, with the springs 26 expanded and balls 13 engaging pins 10, driving wheel A will be coupled with driven wheel *a* and the remaining pairs B, *b* and C, *c* will be in release, so that wheels *b* and *c* will rotate freely between flanges 19 and rings 30 and 31 respectively.

Upon a medium load being encountered, the spanner will be proportionately retarded, bringing balls 13 over the next pins 11, releasing pins 10 and wheel *a*, and locking wheel *b* by its web 18 between its supporting flange 19 and ring 30, the power being then transmitted to shaft 5 with an increase proportioned to the increase of pitch diameter of wheel b; the reduction of pitch diameter of wheel B; and a corresponding reduction in speed of shaft 5.

Likewise, under a maximum load, with pin 12 locking wheel c by its web 18 between flange 19 and ring 31, the speed of shaft 5 is further reduced and its power proportionately increased, the torque of shaft 2 remaining constant throughout.

The invention therefore provides for prompt and automatic adaptation of the speed and power to the work to be performed. Thus, with a crane, a light load may be lifted at a faster speed than a medium one and the speed of the medium load will be faster than that of a heavy load, and these conditions will prevail either in lifting or lowering. When the load is released, the empty chain may be wound on or off the drum at the desirable accelerated speed and resulting economy of time, so that the usual waiting or non-working periods are very materially shortened.

If desired, the mechanism may be utilized with any suitable shifting mechanism adapted to impart adjusted movement to the spanner 14 by manual operation, to shift the gears to suit the work in view, and it will be understood, of course, that the invention is not limited to automatic operation alone.

The construction and operation of the invention will be readily understood and appreciated from the foregoing description. It is comparatively simple in construction, not liable to get out of order, and may, of course, be built in varying proportions and sizes, number of sets of wheels, or otherwise changed to adapt it to various uses and applications within the scope of the following claims.

What I claim is:

1. Power transmitting mechanism comprising a driving shaft, having a spanner, a driven shaft, a plurality of pairs of intermeshing gears, and means for maintaining driving engagement between the shafts through one of said pairs of gears embodying clutch mechanism operable by and subject to relative movement of the driven shaft and spanner.

2. Power transmitting mechanism comprising a driving shaft, having a spanner, a driven shaft, a plurality of pairs of intermeshing gears, and means for maintaining driving engagement between the shafts through one of said pairs of gears and for shifting to driving engagement with another pair of gears upon variation in the load embodying clutch mechanism operable by and subject to relative movement of the driven shaft and spanner.

3. Power transmitting mechanism comprising a driving shaft having a spanner, a driven shaft, a plurality of pairs of intermeshing gears, and means dependent on the load for maintaining driving engagement between the shafts through one of said pairs of gears embodying clutch mechanism operable by and subject to relative movement of the driven shaft and spanner.

4. Power transmitting mechanism comprising a driving shaft having a spanner, a driven shaft, a plurality of pairs of intermeshing gears, and means dependent on the load for maintaining driving engagement between the shafts through one of said pairs of gears and for shifting to driving engagement with another pair of gears upon variation in the load embodying clutch mechanism operable by and subject to relative movement of the driven shaft and spanner.

5. In power transmitting mechanism, a driving shaft having a plurality of fixedly connected gears, a master wheel, a driven shaft in resilient rotative connection with the master wheel, a plurality of floating gears carried by the master wheel and in mesh with the driving gears, and means subject to relative movement of the driven shaft for operatively connecting one of the floating gears with the master wheel.

6. In power transmitting mechanism, a plurality of driving gears, a plurality of floating gears in mesh therewith, a master wheel, a relatively rotatable driven shaft in resilient engagement therewith, and means associated with the master wheel and the driven shaft for effecting an interlock between the master wheel and one of the floating gears.

7. In power transmitting mechanism, a plurality of driving gears, a plurality of floating gears in mesh therewith, a master wheel, a relatively rotatable driven shaft in resilient engagement therewith, and means associated with the master wheel and the driven shaft for effecting an interlock between the master wheel and one of the floating gears and for transmitting motion to the driven shaft.

8. In power transmitting mechanism, a plurality of driving gears, a plurality of floating gears in mesh therewith, a master wheel, a relatively rotatable driven shaft, an intervening resistance cushion, and means associated with the master wheel and the driven shaft for effecting an interlock between the master wheel and one of the floating gears dependent on the resistance of the load on the driven shaft.

9. In power transmitting mechanism, a plurality of driving gears, a plurality of floating gears in mesh therewith, a master wheel, a relatively rotatable driven shaft provided with a fixedly secured spanner, a spring between the master wheel and the spanner, and means associated with the master wheel and the spanner for effecting an interlock between the master wheel and one of the floating gears dependent on the resistance of the load on the driven shaft.

10. In power transmitting mechanism, a plurality of driving gears, a plurality of floating gears in mesh therewith, a master wheel, a relatively rotatable driven shaft provided with a flexibly secured spanner having laterally extending portions, cushion springs between said portions and opposing portions of the master wheel, a series of locking pins carried by the master wheel adapted to effect clutch engagement between it and one of the floating gears, and pin actuating devices rotatably mounted in the spanner.

11. In power transmitting mechanism, a plurality of driving gears, a plurality of floating gears in mesh therewith, a master wheel, a relatively rotatable driven shaft provided with a flexibly secured spanner having laterally extending portions, cushion springs between said portions and opposing portions of the master wheel, a series of locking pins carried by the master wheel adapted to effect clutch engagement between it and one of the floating gears, and pin pressing balls carried by the spanner adapted to actuate particular pins to effect clutch connection with a particular floating gear.

12. In power transmitting mechanism, a plurality of driving gears, a plurality of floating gears in mesh therewith, a master wheel, a relatively rotatable driven shaft provided with a flexibly secured spanner having laterally extending portions, cushion springs between said portions and opposing portions of the master wheel, a series of locking pins carried by the master wheel adapted to effect clutch engagement between it and one of the floating gears, pin-pressing balls adapted to traverse across the terminals and to depress the several pins by pairs thereof, and an annular ball-holding frame and pressure ring carried by the spanner.

13. In apparatus of the class described, the combination with a plurality of variable size power transmitting gears, of a master wheel having individual clutching devices for each gear, a relatively movable driven shaft having a power transmitting element, and means fixedly connected with the driven shaft in cushioned engagement with the master wheel and having portions adapted to engage the clutching devices.

14. In apparatus of the class described, the combination with a plurality of variable size power transmitting gears, of a master wheel having individual clutching devices for each gear, spring retaining portions having resisting abutments, a power transmitting shaft extending centrally through the master wheel, a spanner secured thereto having laterally extending arms, springs between said arms and the abutments of the master wheel, and balls rotatably mounted with the spanner adapted to engage the clutching devices.

15. In apparatus of the class described, the combination with a plurality of variable size power transmitting gears, of a master wheel having individual clutching devices for each gear, spring retaining portions having resisting abutments, a power transmitting shaft extending centrally through the master wheel, a spanner secured thereto having laterally extending arms, springs between said arms and the abutments of the master wheel, balls rotatably mounted with the spanner adapted to engage the clutching devices, and means exerting longitudinal pressure on the power transmitting shaft and the balls to maintain effective pressure through said balls against the clutching devices.

16. In apparatus of the class described, the combination with a plurality of variable size power transmitting gears, of a master wheel, a series of wheel plates having fixed hub connection with the master wheel, a corresponding series of loose clamping rings, a series of floating gears having webs interposed between the wheel plates and clamping rings, a thrust pin for each clamping ring carried by the master wheel, a power transmitting shaft extending centrally through the master wheel, and a spanner secured thereto in cushioned engagement with the master wheel and having portions adapted to engage the thrust pins.

17. In apparatus of the class described, the combination with a plurality of variable size power transmitting gears, of a master wheel, a series of wheel plates having fixed hub connection with the master wheel, a corresponding series of loose clamping rings, a series of floating gears having webs interposed between the wheel plates and clamping rings, a thrust pin for each clamping ring carried by the master wheel, a power transmitting shaft extending centrally through the master wheel, a spanner secured thereto in cushioned engagement with the master wheel, and balls rotatably mounted with the spanner adapted to engage and depress the thrust pins.

18. In apparatus of the class described, the combination with a plurality of variable size power transmitting gears, of a master wheel, a series of wheel plates having fixed hub connection with the master wheel, a corresponding series of loose clamping rings, a series of floating gears having webs interposed between the wheel plates and clamping rings, a thrust pin for each clamping ring carried by the master wheel, a power transmitting shaft extending centrally through the master wheel, a spanner secured thereto in cushioned engagement with the master wheel, balls rotatably mounted with the spanner adapted to engage and depress the thrust pins, and a spring arranged to exert pressure by the spanner against the balls.

19. In power transmitting mechanism embodying a driving shaft, a driven shaft having a fixedly attached pressing member, a series of gears secured to the driving shaft, and a series of floating gears surrounding the driven shaft; an individual locking device for operatively connecting one of the floating gears to the driven shaft, and a rolling actuating element therefor mounted in the pressing member of the driven shaft, adapted to be carried thereby into operative engagement with the locking device.

20. In power transmitting mechanism embodying a driving shaft, a driven shaft having a fixedly attached pressing member, a series of gears secured to the driving shaft, and a series of floating gears surrounding the driven shaft; a series of individual locking pins for successively connecting the floating gears to the driven shaft, and a rolling ball mounted in and laterally movable with the pressing member of the driven shaft adapted to be carried thereby into operative engagement with the several locking pins in the order described.

In testimony whereof I hereunto affix my signature.

HANS ENARD.